United States Patent
Liu et al.

(10) Patent No.: US 9,195,082 B2
(45) Date of Patent: Nov. 24, 2015

(54) BREAK SEPARATION APPARATUS AND BREAK SEPARATION METHOD

(71) Applicants: BOE Technology Group Co., Ltd., Beijing (CN); Beijing BOE Display Technology Co., Ltd., Beijing (CN)

(72) Inventors: Xiaowang Liu, Beijing (CN); Hongyan Guo, Beijing (CN); Rutao Liu, Beijing (CN); Zhongbo Gong, Beijing (CN); Jiazhi Zhu, Beijing (CN)

(73) Assignees: BOE Technology Group Co., Ltd., Beijing (CN); Beijing BOE Display Technology Co., Ltd., Beijing (CN)

( * ) Notice: Subject to any disclaimer, the term of this patent is extended or adjusted under 35 U.S.C. 154(b) by 65 days.

(21) Appl. No.: 13/982,562

(22) PCT Filed: Nov. 23, 2012

(86) PCT No.: PCT/CN2012/085205
§ 371 (c)(1),
(2) Date: Jul. 30, 2013

(87) PCT Pub. No.: WO2013/127209
PCT Pub. Date: Sep. 6, 2013

(65) Prior Publication Data
US 2014/0148073 A1    May 29, 2014

(30) Foreign Application Priority Data
Feb. 29, 2012  (CN) .......................... 2012 1 0050149

(51) Int. Cl.
*G02F 1/1333*  (2006.01)
*C03B 33/033*  (2006.01)
(52) U.S. Cl.
CPC ............ *G02F 1/1333* (2013.01); *C03B 33/033* (2013.01); *G02F 1/133351* (2013.01); *B65G 2249/04* (2013.01)

(58) Field of Classification Search
CPC ............ C03B 33/033; G02F 1/133351; G02F 1/1333
See application file for complete search history.

(56) References Cited

U.S. PATENT DOCUMENTS 5,618,759 A * 4/1997 Boysel ........................ 438/464
5,953,590 A * 9/1999 Piper et al. .................... 438/113
(Continued)

FOREIGN PATENT DOCUMENTS

CN      1442738 A    9/2003
CN    102136454 A    7/2011
(Continued)

OTHER PUBLICATIONS

First Office Action issued by State Intellectual Property Office of the People's Republic of China for Chinese Patent Application No. 2012100501491 dated Oct. 23, 2013, 8pgs.
(Continued)

*Primary Examiner* — Elmito Breval

(57) ABSTRACT

A break separation apparatus and method are provided. The apparatus comprises a vibration stage for holding at least one liquid crystal panel to be separated and vibrating the liquid crystal panel so that glass substrate of the liquid crystal panel breaks along a cutting groove. According to the apparatus and method, the cutting grooves cut on the glass substrate are substantially extended in thickness direction of the glass substrate by vibration method so as to achieve separation, which can be readily controlled and avoid contamination and damage to the liquid crystal panel.

6 Claims, 1 Drawing Sheet

(56) References Cited

U.S. PATENT DOCUMENTS

| | | | |
|---|---|---|---|
| 6,612,910 B1 * | 9/2003 | Hirano et al. | 451/41 |
| 6,746,022 B2 * | 6/2004 | Cheung et al. | 279/3 |
| 2002/0167638 A1 * | 11/2002 | Byun et al. | 349/187 |
| 2006/0150788 A1 * | 7/2006 | Kim | 83/13 |
| 2008/0002137 A1 * | 1/2008 | Kim et al. | 349/187 |

FOREIGN PATENT DOCUMENTS

| | | | |
|---|---|---|---|
| CN | 102643018 A | 8/2012 | |
| EP | 2138469 A1 | 12/2009 | |
| JP | 63166734 A | 7/1998 | |
| JP | 10291084 A | 11/1998 | |
| JP | 2003-119043 A | 4/2003 | |
| JP | 2007-45642 A | 2/2007 | |

OTHER PUBLICATIONS

English Translation of First Office Action issued by State Intellectual Property Office of the People's Republic of China for Chinese Patent Application No. 2012100501491 dated Oct. 23, 2013, 8pgs.
International Search Report for International Application No. PCT/CN2012/085205 issued Mar. 7, 2013, 14pgs.
International Search Report for International Application No. PCT/CN2012/085205 dated Sep. 2, 2014, 9pgs.

\* cited by examiner

BREAK SEPARATION APPARATUS AND BREAK SEPARATION METHOD

CROSS REFERENCE TO RELATED APPLICATIONS

This application is based on International Application No. PCT/CN2012/085205 filed on Nov. 23, 2012, which claims priority to Chinese National Application No. 201210050149.1, filed on Feb. 29, 2012, the contents of which are incorporated herein by reference.

FIELD

The present disclosure relates to field of liquid crystal display, in particular to a break separation apparatus and break separation method.

BACKGROUND

During fabrication of liquid crystal display (LCD), after assembling array substrate and color filter substrate, liquid crystal display panels with desired size is obtained by scribing and cutting a large block of liquid crystal panel. As shown in FIG. 1, a cutting groove 2 is formed on surface of glass substrate of the liquid crystal panel along a cutting line by a diamond roller blade 1, which is rolled and cut into the liquid crystal panel under pressure. The cutting groove 2 has a depth of 80~110 μm in a vertical direction relative to the surface of glass substrate. The glass substrate of the liquid crystal panel has a typical thickness of 0.5 mm~1.1 mm. Thus after the above cutting process, the whole block of liquid crystal panel with the cutting grooves will be transferred to a break separation stage where it is subjected to a break separation process so as to obtain liquid crystal display panels with final desired size. During the break separation process, the cutting groove 2 is substantially extended in a vertical direction relative to surface of glass substrate.

There are two major kinds of conventional break separation processes including contact break separation such as roller break separation and non-contact break separation.

In roller break separation process, a roller is pressed against surface of glass substrate of array substrate and/or color filter substrate under certain pressure so that the cutting groove is substantially extended in thickness direction of the glass substrate in order to separate panels. In the above process, it is difficult to adjust the pressure. If the pressure is too large, it might damage the panel; if the pressure is too small, the glass debris generated during cutting might remain on the panel and are difficult to remove. Furthermore, it is difficult to control locations of the cutting line of the roller. Therefore, defects such as X line and chipping might occur and lead to panel failure.

In non-contact break separation process, a heated pressurized water vapor is jetted at the cutting grooves and the panels are separated due to cold contraction during temperature drop caused by evaporation of vapor. In the above process, it is difficult to adjust amount of vapor. If the amount of vapor is too less, it might cause incomplete separation; if the amount of vapor is too more, water will be left on the surface of glass substrate. Furthermore, the panel might be contaminated since glass debris generated during cutting will be more likely to attach onto surface of glass substrate due to the adhesiveness of water molecules.

SUMMARY

The present disclosure provides a break separation apparatus and method, which can be readily controlled and can avoid contamination and damage to the liquid crystal panel.

The present disclosure provides a break separation apparatus. The apparatus comprises: a vibration stage for holding at least one liquid crystal panel to be separated and vibrating the liquid crystal panel so that glass substrate of the liquid crystal panel breaks along a cutting groove.

In one example, the apparatus further comprises a high frequency motor for actuating vibration of the vibration stage and the high frequency motor is connected to the vibration stage.

In one example, the high frequency motor has a vibration frequency of 50~500 Hz.

In one example, the vibration stage has one or more through holes disposed thereon. The through hole is connected to a vacuum device for fixing the liquid crystal panel onto the vibration stage by suction force generated by vacuum of the through hole.

In one example, the apparatus further comprising an elastic support member disposed below the vibration stage for elastically supporting the vibration stage; and a base disposed below the elastic support member for isolating vibration generated by the vibration stage.

In one example, the elastic support member can be one or more springs disposed between the vibration stage and the base.

The present disclosure provides a break separation method comprising following steps of: forming cutting grooves on a large block of liquid crystal panel by cutting a glass substrate of the liquid crystal panel to be separated; and separating the liquid crystal panel by vibrating the liquid crystal panel to be separated so that the glass substrate of the liquid crystal panel breaks along the cutting grooves.

According to the apparatus and method of the present disclosure, the cutting grooves cut on the glass substrate are substantially extended in thickness direction of the glass substrate by a vibration method so as to achieve separation, which can be readily controlled and avoid contamination and damage to the liquid crystal panel.

BRIEF DESCRIPTION OF THE DRAWINGS

The accompanying drawings of technical solutions of the present disclosure or the prior art are briefly described as following for better illustration of the technical solutions of the present disclosure or the prior arts. It is apparent that the accompanying drawings as described below are mere illustrations for some embodiments of the technical solutions of the present disclosure and thus other accompanying drawings are readily conceivable based on these accompanying drawings for the skilled in the art without creative works.

DETAILED DESCRIPTION OF THE PREFERRED EMBODIMENTS

The technical solutions of embodiments of the present disclosure will be described in more detail with reference to the accompanying drawings. It is apparent that the embodiments as described are merely a part of embodiments of the present disclosure and do not represent all embodiments. All other embodiments readily conceivable by the skilled in the art based on the described embodiments of the present disclosure without creative works fall into the protection scope of the present disclosure.

The break separation apparatus and method provided by the present disclosure is described in detail with reference to accompanying drawings and embodiments.

According to the apparatus and method of the present disclosure, the cutting grooves cut on the glass substrate are substantially extended in thickness direction of the glass substrate by vibration method so as to achieve separation.

Figure 1:
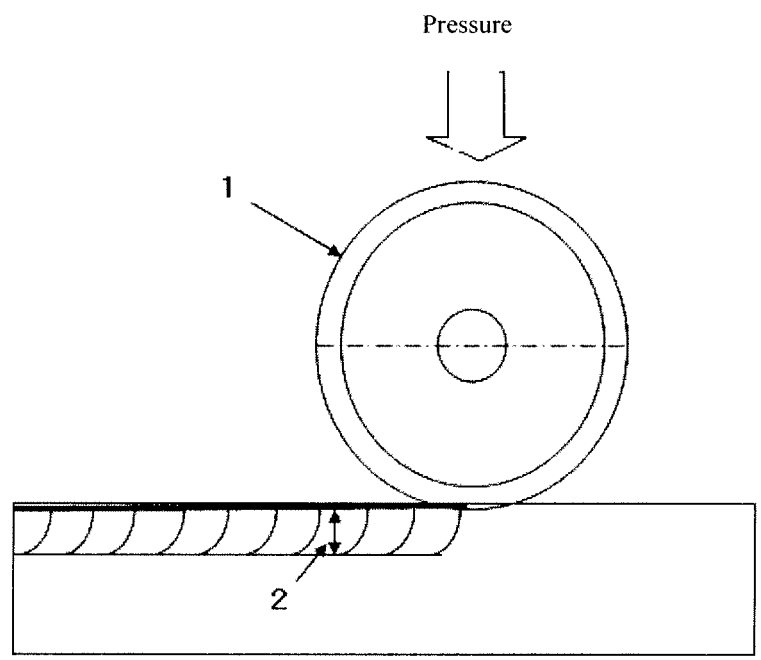
FIG. 1 is a schematic view of conventional cutting process.
Figure 2:
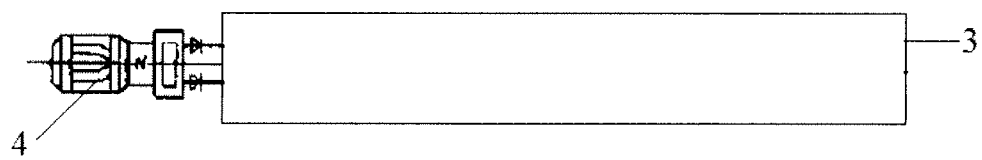
FIG. 2 is a top schematic view of break separation apparatus according to an embodiment of the present disclosure.

As show in FIG. 2, the break separation apparatus according to one embodiment of the present disclosure comprises a vibration stage 3 for holding at least one liquid crystal panel to be separated. During operation, the vibration stage 3 vibrates the liquid crystal panel so that cutting grooves on glass substrate of the liquid crystal panel are extended substantially during vibration so that glass substrate of the liquid crystal panel breaks along cutting grooves to achieve separation.

The apparatus according to the present embodiment further comprises a high frequency motor 4 for actuating vibration of the vibration stage 3. The high frequency motor 4 is connected to the vibration stage 3. The vibration frequency of the high frequency motor 4 is in a range that is not resonated with liquid crystal molecules, otherwise it might adversely affect distribution of liquid crystal molecules. The vibration frequency is preferably in a range of 50~500 Hz.

In addition, in order to prevent collision among liquid crystal panels placed on the vibration stage 3 at the same time during separation process, it is necessary to fix the liquid crystal panels during vibration. In the present embodiment, a vacuum fixing method is used in order to avoid contamination and damage which might be induced by other fixing method. In the present embodiment, the vibration stage 3 has one or more through holes (not shown) disposed thereon, and the through hole is connected to a vacuum device such as vacuum pump. After the liquid crystal panel is transferred to the vibration stage 3, the vacuum device is turned on, then the liquid crystal panel is fixed onto the vibration stage 3 by suction force generated by vacuum of the through hole on the vibration stage 3.

Figure 3:
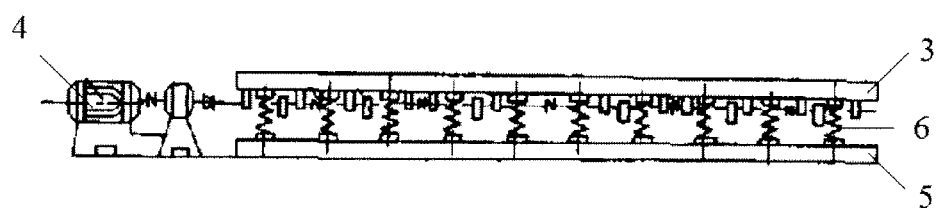
FIG. 3 is a side schematic view of break separation apparatus according to an embodiment of the present disclosure.

During fabricating process of liquid crystal display, respective processes are performed sequentially in the production line. Therefore the vibration of the break separation apparatus according to the present embodiment might affect upstream and downstream apparatuses. For example, in some severe cases, the vibration might affect cutting accuracy of an upstream cutting process and transferring accuracy for upstream and downstream apparatuses. Therefore, the break separation apparatus according to the present disclosure can further include vibration isolation measures for the vibration stage 3 so as to avoid operations of upstream and downstream apparatuses. As shown in FIG. 3, the break separation apparatus further comprises an elastic support member 6 and a base 5. The elastic support member 6 is disposed below the vibration stage 3 to elastically support the vibration stage 3 and absorb or consume energy generated by the vibration of the vibration state 3. The elastic support member 6 can be an elastic support device including but not limited to spring, hydraulic pressure device. The base 5 is disposed below the elastic support member 6. In one example, the elastic support member 6 can be one or more springs disposed between the vibration stage 3 and the base 5. The base 5 can isolate vibration generated by the vibration stage 3.

In the break separation apparatus according to the present embodiment, a liquid crystal panel formed with cutting grooves on upper surface of glass substrate of the panel is transferred to the vibration stage, and glass substrate of the liquid crystal panel is fixed on the vibration stage under vacuum force. The vibration stage and glass substrate vibrate together by actuation of high frequency motor so that cutting grooves are substantially extended to opposite surface of the glass substrate. Therefore the separation is achieved.

The present disclosure also provides a break separation method by which a liquid crystal panel to be separated is vibrated so that glass substrate of the liquid crystal panel is separated along cutting grooves. The method comprises following steps of: S1, forming cutting grooves on a large block of liquid crystal panel by cutting a glass substrate of the liquid crystal panel to be separated; S2, placing at least one liquid crystal panel formed with the cutting grooves on a vibration stage and fixing the liquid crystal panel using vacuum suction force; and S3, vibrating the vibration stage and the liquid crystal panel thereon using a high frequency motor connected to the vibration stage so that the cutting grooves on the glass substrate are extended substantially in thickness direction of glass substrate, until the glass substrate is separated along cutting grooves.

In the apparatus and method according to present disclosure, break separation is achieved by vibration, therefore reducing risk of damaging liquid crystal panel. The vibration can be easily controlled and enable complete separation of the glass substrate. As such, the depth of cutting grooves during previous cutting process can be reduced so as to reduce risks during transferring process. In addition, the vibration stage for break separation has simple structure and can be used for performing subsequent processes so as to further reduce risks during transfer process to a downstream apparatus, save transfer time and reduce overall process time.

The above embodiments are intended only to illustrate the present invention and not limit the present invention. Various modifications and variations can be made by the skilled in the art without departing the spirit and scope of the present invention, such that all those equivalent solutions also fall into protection scope of the present invention which is defined by appended claims.

What is claimed is:

1. A break separation apparatus, comprising:
    a vibration stage for holding at least one liquid crystal panel to be separated and vibrating the liquid crystal panel so that a glass substrate of the liquid crystal panel breaks along a cutting groove, wherein the vibration stage has one or more through holes disposed thereon, the through hole being connected to a vacuum device for fixing the liquid crystal panel onto the vibration stage by suction force generated by vacuum of the through hole; and
    a high frequency motor for actuating vibration of the vibration stage and the high frequency motor being connected to the vibration stage.

2. The apparatus of claim 1 wherein the high frequency motor has a vibration frequency of 50~500 Hz.

3. The apparatus of claim 1 further comprising:
    an elastic support member disposed below the vibration stage for elastically supporting the vibration stage; and
    a base disposed below the elastic support member for isolating vibration of the vibration stage.

4. The apparatus of claim 3 wherein the elastic support member is one or more springs disposed between the vibration stage and the base.

5. A break separation method comprising following steps of:
    forming cutting grooves on a large block of liquid crystal panel by cutting a glass substrate of the liquid crystal panel to be separated;
    holding the liquid crystal panel by a vibration stage, the vibration stage having one or more through holes disposed thereon, the through hole being connected to a vacuum device for fixing the large block of liquid crystal panel onto the vibration stage by suction force generated by vacuum of the through hole; and separating the liquid crystal panel by vibrating the liquid crystal panel to be separated so that the glass substrate of the liquid crystal panel breaks along the cutting grooves, the liquid crystal panel being vibrated by a high frequency motor connected to the vibration stage that actuates vibration of the vibration stage.

6. The method of claim 5 wherein the liquid crystal panel is vibrated with a vibration frequency of 50~500 Hz.

* * * * *